US009389727B2

(12) United States Patent
Woolley

(10) Patent No.: US 9,389,727 B2
(45) Date of Patent: Jul. 12, 2016

(54) METHOD AND SYSTEM TO DETERMINE WHEN A DEVICE IS BEING HELD

(71) Applicant: Adrian Woolley, Pleasanton, CA (US)

(72) Inventor: Adrian Woolley, Pleasanton, CA (US)

(73) Assignee: Atmel Corporation, San Jose, CA (US)

( * ) Notice: Subject to any disclaimer, the term of this patent is extended or adjusted under 35 U.S.C. 154(b) by 115 days.

(21) Appl. No.: 13/928,099

(22) Filed: Jun. 26, 2013

(65) Prior Publication Data

US 2015/0002442 A1 Jan. 1, 2015

(51) Int. Cl.
*G06F 3/041* (2006.01)
*G06F 3/045* (2006.01)

(52) U.S. Cl.
CPC ...... *G06F 3/0416* (2013.01); *G06F 2203/0381* (2013.01); *G06F 2203/04106* (2013.01)

(58) Field of Classification Search
CPC .......... G06F 3/0416; G06F 2203/0381; G06F 2203/04106
USPC .................................................. 345/173–178
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2007/0002016 | A1* | 1/2007 | Cho ....................... G06F 1/1626 345/157 |
| 2009/0315854 | A1 | 12/2009 | Matsuo |
| 2010/0085317 | A1* | 4/2010 | Park et al. ..................... 345/173 |
| 2010/0188371 | A1* | 7/2010 | Lowles et al. ................. 345/178 |
| 2012/0154292 | A1* | 6/2012 | Zhao et al. .................... 345/173 |
| 2012/0242588 | A1 | 9/2012 | Myers |
| 2012/0242592 | A1 | 9/2012 | Rothkopf |
| 2012/0242594 | A1* | 9/2012 | Matsumoto ................... 345/173 |
| 2012/0243151 | A1 | 9/2012 | Lynch |
| 2012/0243719 | A1 | 9/2012 | Franklin |
| 2013/0076612 | A1 | 3/2013 | Myers |
| 2013/0234948 | A1* | 9/2013 | Jian ............................... 345/169 |
| 2013/0314340 | A1* | 11/2013 | Shimohata et al. ........... 345/173 |

FOREIGN PATENT DOCUMENTS

WO WO 2012/129247 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Amit Chatly
(74) *Attorney, Agent, or Firm* — Baker Botts L.L.P.

(57) ABSTRACT

In one embodiment, a touch-sensitive device includes a controller that is communicatively coupled to a plurality of electrodes. The controller is operable to access data from a motion sensor of the touch-sensitive device. The controller is further operable to access a plurality of signals from the plurality of electrodes. The signals are indicative of an amount of capacitance between the touch sensor and one or more fingers of a user. The controller is further operable to determine, based on the data from the motion sensor and the plurality of signals from the plurality of electrodes of the touch sensor, a particular hand of the user that is holding the touch-sensitive device.

11 Claims, 8 Drawing Sheets

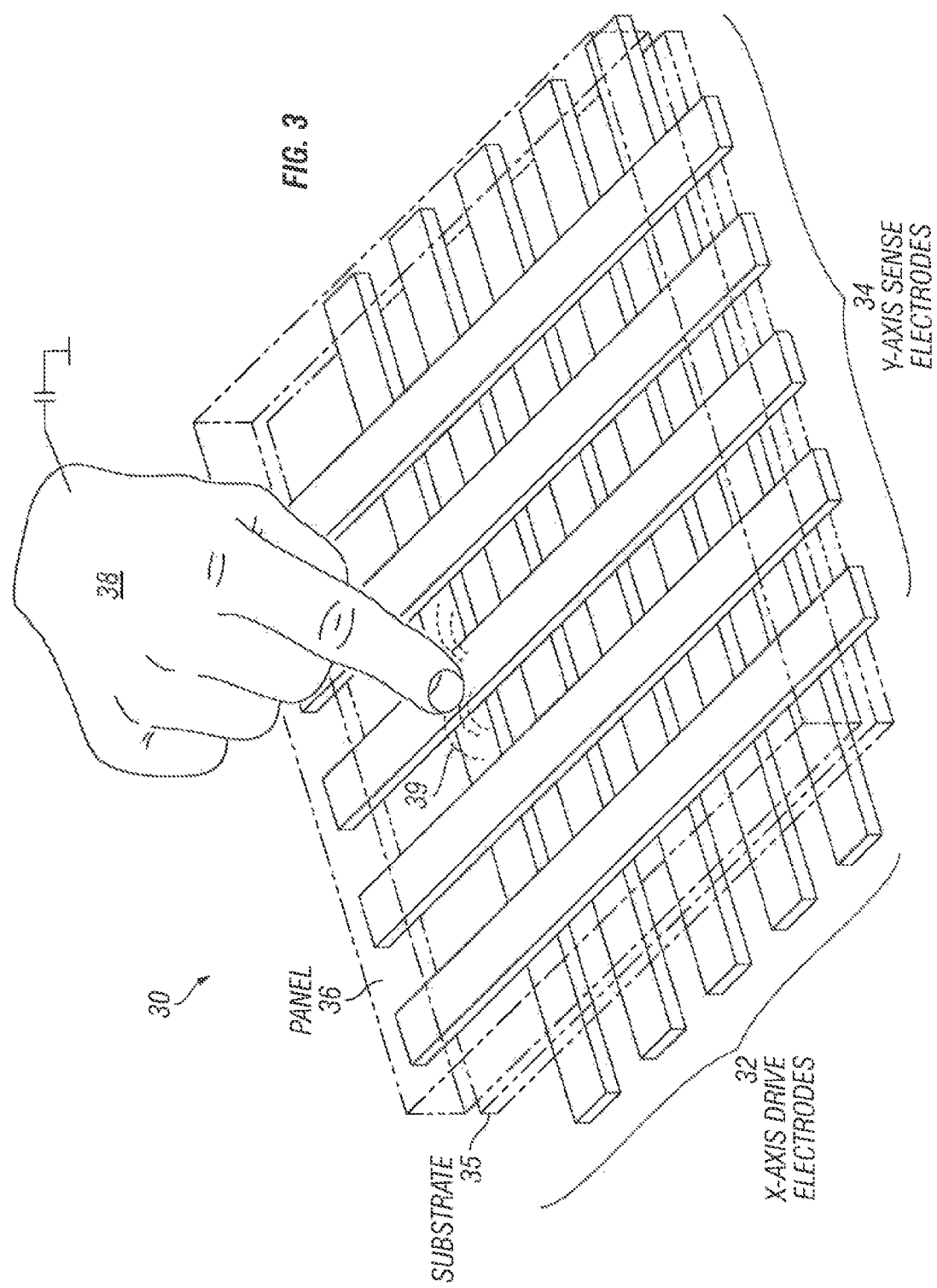

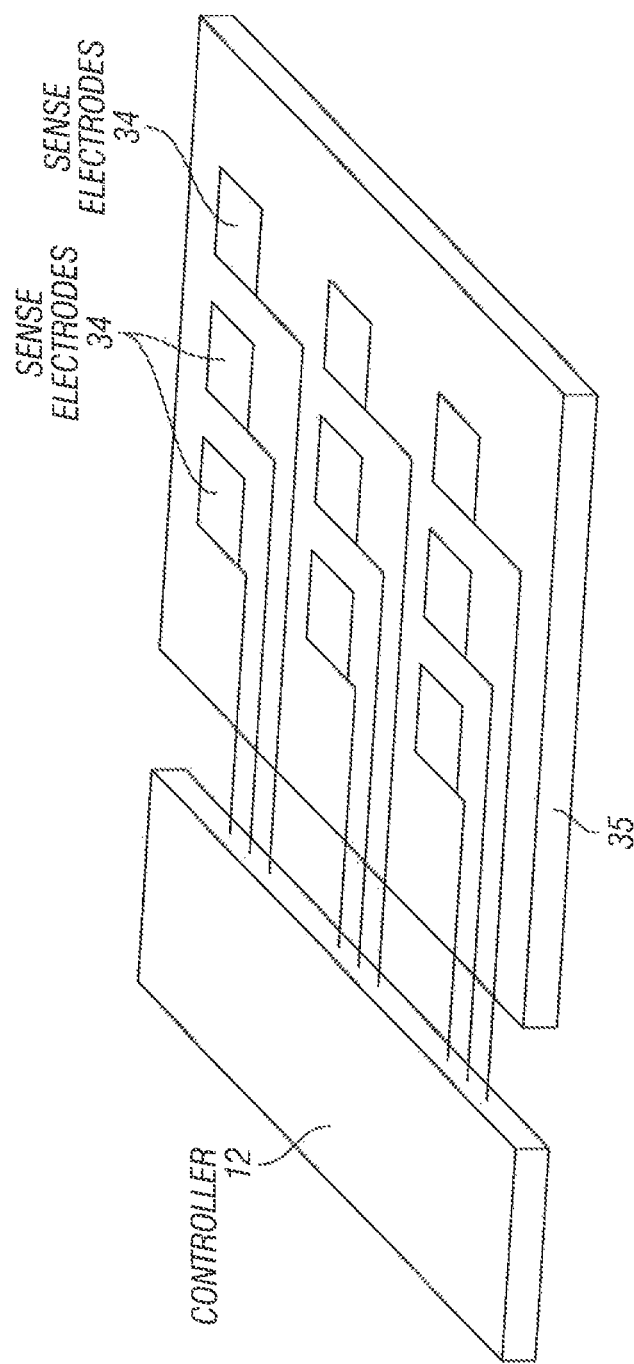

METHOD AND SYSTEM TO DETERMINE WHEN A DEVICE IS BEING HELD

TECHNICAL FIELD

This disclosure generally relates to touch sensors.

A touch sensor detects the presence and location of a touch or the proximity of an object (such as a user's finger) within a touch-sensitive area of the touch sensor overlaid, for example, on a display screen. In a touch-sensitive-display application, the touch sensor enables a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, capacitive touch screens, infrared touch screens, and optical touch screens. Herein, reference to a touch sensor encompasses a touch screen, and vice versa, where appropriate. A capacitive touch screen may include an insulator coated with a substantially transparent conductor in a particular pattern. When an object touches or comes within proximity of the surface of the capacitive touch screen, a change in capacitance occurs within the touch screen at the location of the touch or proximity. A controller processes the change in capacitance to determine the touch position(s) on the touch screen.

BRIEF DESCRIPTION OF THE DRAWINGS

FIG. 3 illustrates an example embodiment of the touch sensor of FIG. 1, according to certain embodiments;

FIG. 4 illustrates another example embodiment of the touch sensor of FIG. 1, according to certain embodiments;

DESCRIPTION OF EXAMPLE EMBODIMENTS

A touch sensor may be utilized by any device such as a tablet computer, personal digital assistant (PDA), smartphone, portable media player, and the like to detect the presence and location of a touch or the proximity of an object (such as a user's finger or a stylus) to a screen of the device. Typically, devices discard or suppress touches of a user's fingers around the edges of the touch screen of the device. In addition, devices are typically not aware when the user is holding the device in a hand, or in which hand of the user (e.g., left or right hand) the device is being held. As a result, typical devices may not effectively or accurately manage power settings for the device or properly control what is displayed to the user.

The teachings of the disclosure recognize that it would be desirable to determine when a user is holding a device in the user's hand and in which hand (e.g., left or right hand) the device is being held. Certain embodiments of the disclosure utilize data from one or more sensors (e.g., a motion sensor) of a touch-sensitive device in combination with capacitance measurements from a touch screen of the touch-sensitive device in order to determine that the touch-sensitive device is being held in a user's hand. Some embodiments additionally or alternatively utilize data from one or more sensors (e.g. a motion sensor) of the touch-sensitive device in combination with capacitance measurements from the touch screen of the touch-sensitive device in order to determine which hand the device is being held (e.g., left or right hand of the user). FIGS. 1 through 7 below illustrate a touch sensor of a touch-sensitive device that determines when a user is holding the device in the user's hand and in which hand (e.g., left or right hand) the device is being held.

Figure 1:
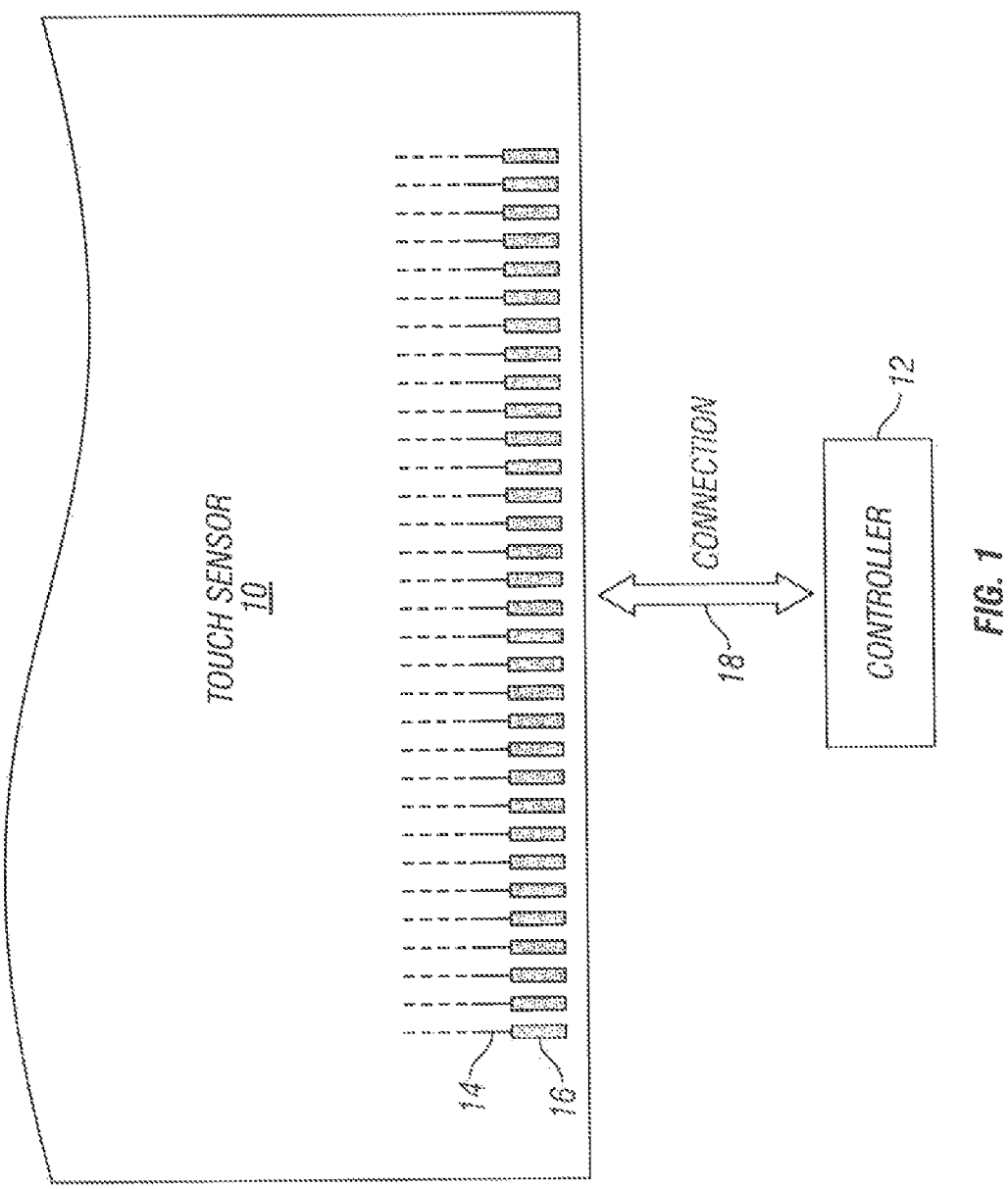
FIG. 1 illustrates an example touch sensor, according to certain embodiments.

FIG. 1 illustrates an example touch sensor 10 with an example controller 12. Herein, reference to a touch sensor may encompass a touch screen, and vice versa, where appropriate. Touch sensor 10 and controller 12 detect the presence and location of a touch or the proximity of an object within a touch-sensitive area of touch sensor 10. Herein, reference to a touch sensor encompasses both the touch sensor and its controller, where appropriate. Similarly, reference to a controller encompasses both the controller and its touch sensor, where appropriate. Touch sensor 10 includes one or more touch-sensitive areas, where appropriate. Touch sensor 10 includes an array of touch electrodes (i.e., drive and/or sense electrodes) disposed on a substrate, which in some embodiments is a dielectric material.

In certain embodiments, one or more portions of the substrate of touch sensor 10 are made of polyethylene terephthalate (PET) or another suitable material. This disclosure contemplates any suitable substrate with any suitable portions made of any suitable material. In particular embodiments, the drive or sense electrodes in touch sensor 10 are made of indium tin oxide (ITO) in whole or in part. In particular embodiments, the drive or sense electrodes in touch sensor 10 are made of fine lines of metal or other conductive material. As an example and not by way of limitation, one or more portions of the conductive material are copper or copper-based and have a thickness of approximately 5 μm or less and a width of approximately 10 μm or less. As another example, one or more portions of the conductive material are silver or silver-based and similarly have a thickness of approximately 5 μm or less and a width of approximately 10 μm or less. This disclosure contemplates any suitable electrodes made of any suitable material.

In certain embodiments, touch sensor 10 implements a capacitive form of touch sensing. In a mutual-capacitance implementation, touch sensor 10 includes an array of drive and sense electrodes forming an array of capacitive nodes. In certain embodiments, a drive electrode and a sense electrode form a capacitive node. The drive and sense electrodes forming the capacitive node come near each other, but do not make electrical contact with each other. Instead, the drive and sense electrodes are capacitively coupled to each other across a gap between them. A pulsed or alternating voltage applied to the drive electrode (i.e., by controller 12) induces a charge on the sense electrode, and the amount of charge induced is susceptible to external influence (such as a touch or the proximity of an object). When an object touches or comes within proximity of the capacitive node, a change in capacitance occurs at the capacitive node and controller 12 measures the change in capacitance. By measuring changes in capacitance throughout the array, controller 12 determines the position of the touch or proximity within the touch-sensitive area(s) of touch sensor 10.

In particular embodiments, one or more drive electrodes together form a drive line running horizontally or vertically or in any suitable orientation. Similarly, one or more sense electrodes together form a sense line running horizontally or vertically or in any suitable orientation. In particular embodiments, drive lines run substantially perpendicular to sense lines. Herein, reference to a drive line encompasses one or more drive electrodes making up the drive line, and vice versa, where appropriate. Similarly, reference to a sense line encompasses one or more sense electrodes making up the sense line, and vice versa, where appropriate.

In certain embodiments, touch sensor 10 has a single-layer mutual capacitance configuration, with drive and sense electrodes disposed in a pattern on one side of a substrate. In such a configuration, a pair of drive and sense electrodes capacitively coupled to each other across a space between them forms a capacitive node. In a configuration for a self-capacitance implementation, as illustrated in FIG. 4, electrodes of only a single type (e.g. sense) are disposed in a pattern on the substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 is operable to detect and process the change in capacitance to determine the presence and location of the touch or proximity input. Certain embodiments if controller 12 communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

In certain embodiments, controller 12 is one or more integrated circuits (ICs)—such as for example general-purpose microprocessors, microcontrollers, programmable logic devices or arrays, and application-specific ICs (ASICs). In some embodiments, controller 12 is coupled to a flexible printed circuit (FPC) bonded to the substrate of touch sensor 10, as described below. Certain embodiments of controller 12 include a processor unit, a drive unit, a sense unit, and a storage unit. The drive unit supplies drive signals to the drive electrodes of touch sensor 10. The sense unit senses charge at the capacitive nodes of touch sensor 10 and provides measurement signals to the processor unit representing capacitances at the capacitive nodes. The processor unit controls the supply of drive signals to the drive electrodes by the drive unit and process measurement signals from the sense unit to detect and process the presence and location of a touch or proximity input within the touch-sensitive area(s) of touch sensor 10. The processor unit also tracks changes in the position of a touch or proximity input within the touch-sensitive area(s) of touch sensor 10. The storage unit, which includes one or more memory devices, stores programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 couple the drive or sense electrodes of touch sensor 10 to connection pads 16, also disposed on the substrate of touch sensor 10. As described below, connection pads 16 facilitate coupling of tracks 14 to controller 12. In certain embodiments, tracks 14 extend into or around (e.g. at the edges of) the touch-sensitive area(s) of touch sensor 10. Particular tracks 14 provide drive connections for coupling controller 12 to drive electrodes of touch sensor 10, through which the drive unit of controller 12 supplies drive signals to the drive electrodes. Other tracks 14 provide sense connections for coupling controller 12 to sense electrodes of touch sensor 10, through which the sense unit of controller 12 senses charge at the capacitive nodes of touch sensor 10. In certain embodiments, tracks 14 are made of fine lines of metal or other conductive material. As an example and not by way of limitation, the conductive material of tracks 14 is copper or copper-based and have a width of approximately 100 µm or less. As another example, the conductive material of tracks 14 is silver or silver-based and have a width of approximately 100 µm or less. In particular embodiments, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, certain embodiments of touch sensor 10 include one or more ground lines terminating at a ground connector (similar to a connection pad 16) at an edge of the substrate of touch sensor 10 (similar to tracks 14).

In certain embodiments, connection pads 16 are located along one or more edges of the substrate, outside the touch-sensitive area(s) of touch sensor 10. As described above, controller 12 is on an FPC in certain embodiments. In some embodiments, connection pads 16 are made of the same material as tracks 14 and are bonded to the FPC using an anisotropic conductive film (ACF). In certain embodiments, connection 18 includes conductive lines on the FPC coupling controller 12 to connection pads 16, in turn coupling controller 12 to tracks 14 and to the drive or sense electrodes of touch sensor 10. In another embodiment, connection pads 160 are inserted into an electro-mechanical connector (such as a zero insertion force wire-to-board connector); in this embodiment, connection 180 does not need to include an FPC. This disclosure contemplates any suitable connection 18 between controller 12 and touch sensor 10.

Figure 2:
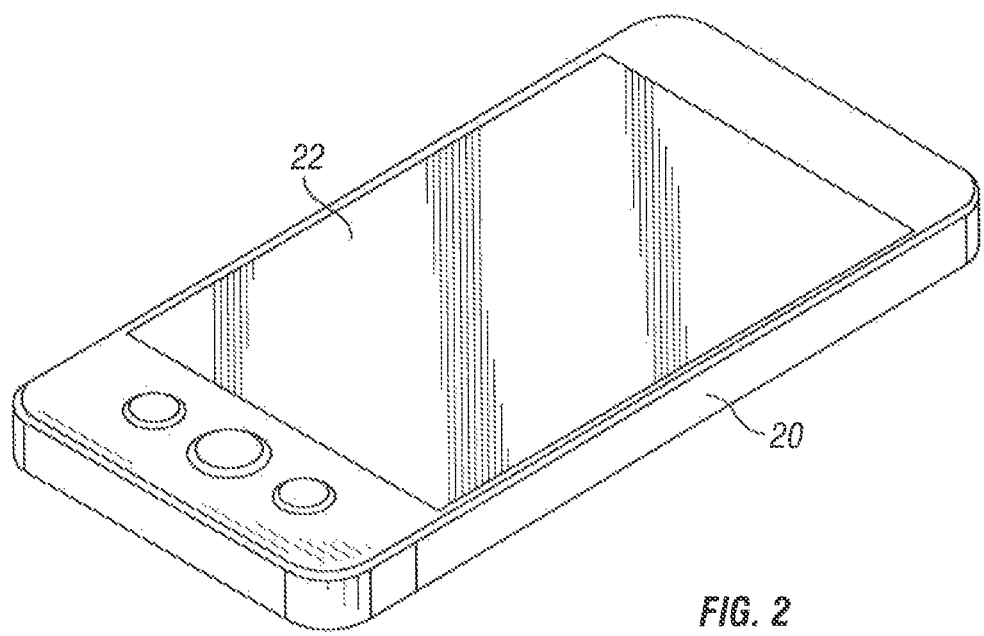
FIG. 2 illustrates an example device that utilizes the touch sensor of FIG. 1, according to certain embodiments.

FIG. 2 illustrates an example device 20 that utilizes touch sensor 10 of FIG. 1. Device 20 includes any personal digital assistant, cellular telephone, smartphone, tablet computer, and the like. For example, a certain embodiment of device 20 is a smartphone that includes a touchscreen display 22 (e.g., screen) occupying a significant portion of the largest surface of the device. In certain embodiments, the large size of touchscreen display 22 enables the touchscreen display 22 to present a wide variety of data, including a keyboard, a numeric keypad, program or application icons, and various other interfaces as desired. In certain embodiments, a user interacts with device 20 by touching touchscreen display 22 with a stylus, a finger, or any other appropriate object in order to interact with device 20 (i.e., select a program for execution or to type a letter on a keyboard displayed on the touchscreen display 22). In certain embodiments, a user interacts with device 20 using multiple touches to perform various operations, such as to zoom in or zoom out when viewing a document or image.

In some embodiments, device 20 includes one or more sensors 24 (not illustrated). Sensor 24 may include any appropriate sensor such as an accelerometer, a gyroscope, a compass, a light sensor, a camera, a temperature sensor, a humidity sensor, or any other appropriate motion or physical sensor. In some embodiments, sensor 24 may be wholly internal to device 20. In some embodiments, sensor 24 may be at least partially exposed on the surface of device 20. In general, sensor 24 captures a physical measurement (e.g., motion, light, temperature, humidity, etc.) associated with device 20 and provides data corresponding to the physical measurement.

In some embodiments, sensor 24 may be an individual sensor as discussed above. In some embodiments, however, sensor 24 may refer to a combination of sensors that is used to determine motion or position. That is, either motion or a specific orientation of device 20 may be determined by a combination of sensors 24, not just a single sensor 24 as described above. For example, motion may determined based on a change in position that is expressed in quaternion representation (or, in some embodiments, as a rotation matrix) that is calculated based on inputs from an accelerometer, a gyroscope, and magnetometer sensors (e.g., a nine degree of freedom sensor fusion). As used herein, "sensor" or "motion sensor" may refer to a single sensor 24 or to a combination of two or more sensors 24.

FIG. 3 illustrates a touch sensor 30 that may be utilized as touch sensor 10 of FIG. 1. Touch sensor 30 includes drive electrodes 32, sense electrodes 34, a substrate 35, and a panel 36. In some embodiments, panel 36 is a transparent panel. In other embodiments, panel 36 is not transparent. In some embodiments, substrate 35 is sandwiched between drive electrodes 32 and sense electrodes 34, and sense electrodes 34 are coupled to an underside of panel 36 with, for example, an adhesive. In other embodiments, touch sensor 30 includes any appropriate configuration and number of layers of electrodes and substrates. For example, some embodiments of touch sensor 30 include additional layers of sense electrodes 32 that run perpendicular (or any other appropriate angle) to sense electrodes 34. In some embodiments, drive electrodes 32 and sense electrodes 34 are on the same layer in any appropriate pattern (e.g., a caterpillar design in which drive electrodes 32 and sense electrodes 34 have interdigitated teeth).

In certain embodiments, electrodes 32 and 34 are configured in a manner substantially similar to the drive and sense electrodes, respectively, described above with reference to FIG. 1, and touch object 38 is capacitively coupled to ground. In certain embodiments, touch sensor 30 determines the location of touch object 38 at least in part by using controller 12 to apply a pulsed a or alternating voltage to drive electrodes 32, which induces a charge on sense electrodes 34. When touch object 38 touches or comes within proximity of an active area of touch sensor 30, a change in capacitance may occur, as depicted by electric field lines 39 in FIG. 3. The change in capacitance is sensed by sense electrodes 34 and measured by controller 12. By measuring changes in capacitance throughout an array of sense electrodes 34, controller 12 determines the position of the touch or proximity within the touch-sensitive area(s) of touch sensor 30.

FIG. 4 illustrates a self-capacitance embodiment of touch sensor 10. In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

Touch-sensitive devices such as device 20 typically discard or otherwise suppress touches of touch object 38 along the edges of touchscreen display 22. For example, some touch-sensitive devices may suppress or otherwise suppress touches of a touch object 38 that are within a predetermined distance from any edge of touchscreen display 22. As described in more detail below with reference to FIGS. 5-7, embodiments of touch sensor 10 provide advantages over typical devices by utilizing detections of one or more touches of touch object 38 along the edges of touchscreen display 22 in combination with data from another sensor (e.g., sensor 24) in order to determine when a user is holding device 20 in the user's hand and in which hand (e.g., left or right hand) device 20 is being held. As a result, the disclosed embodiments provide advantages over typical touch-sensitive devices because they may more effectively and accurately control power consumption of a device based on when it is determined that device 20 is being held. For example, device 20 may power-down certain portions of device 20 (e.g., a global positioning system (GPS)) when it is determined that device 20 is not being held. In addition, the disclosed embodiments may provide other advantages by utilizing the determined knowledge of which hand (e.g., left of right) is holding device 20 to more effectively control what is displayed on touchscreen display 22. For example, certain portions of a graphical user interface (GUI) such as a keyboard displayed on touchscreen display 22 may change based on which hand of a user is holding device 20.

Figure 5A:
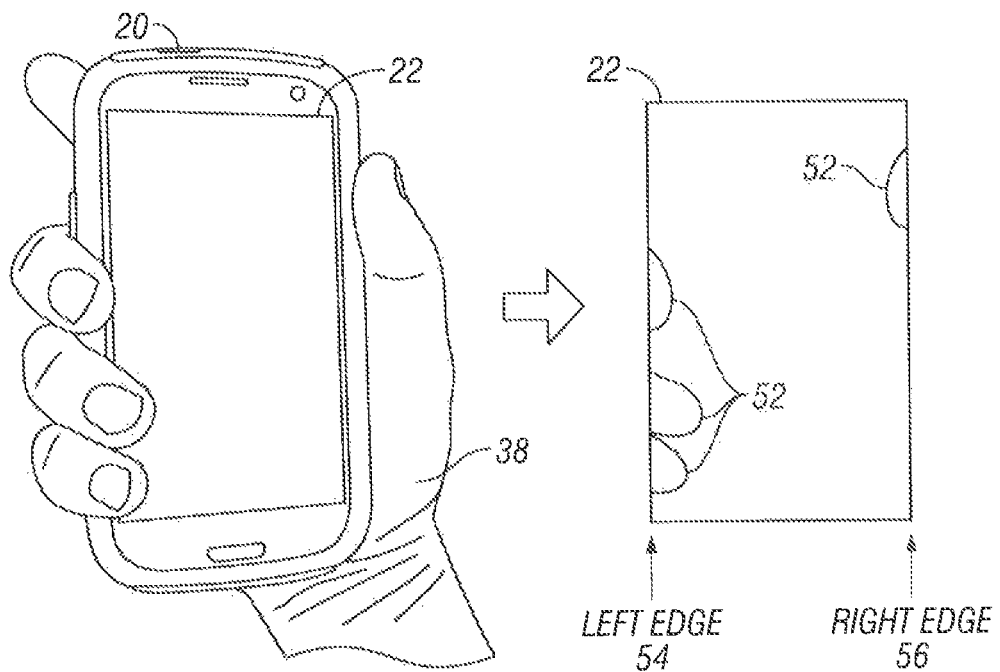
FIGS. 5A-5E illustrate a user holding the device of FIG. 2, according to certain embodiments.
Figure 5B:
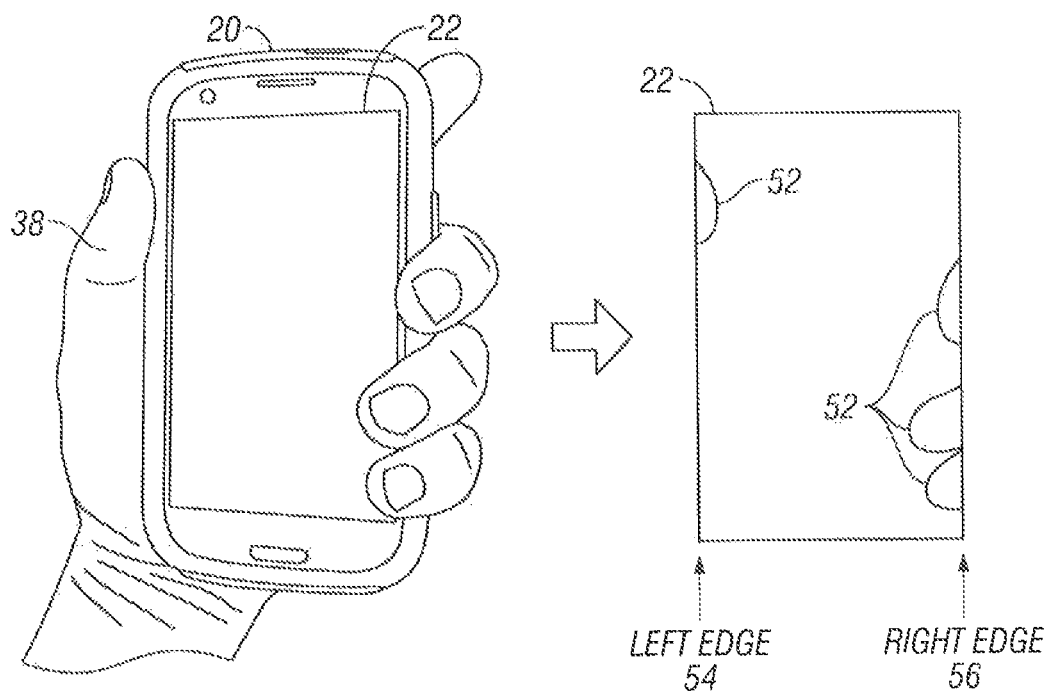
Figure 5C:
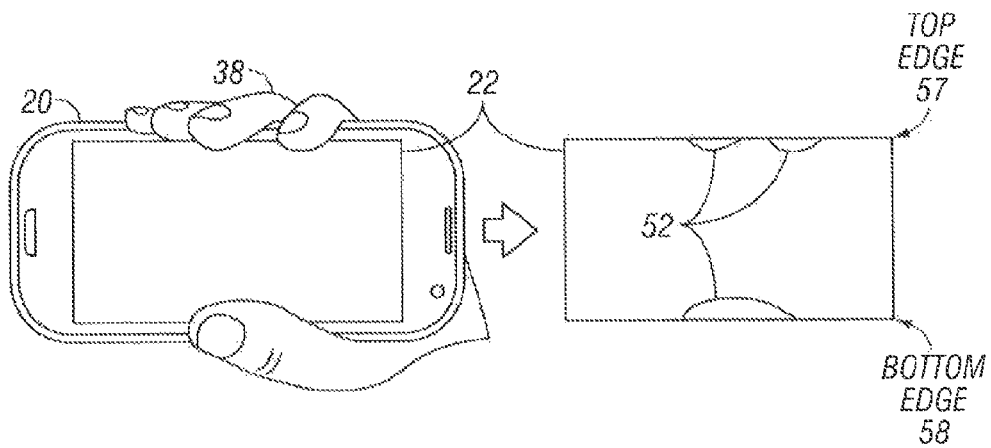
Figure 5D:
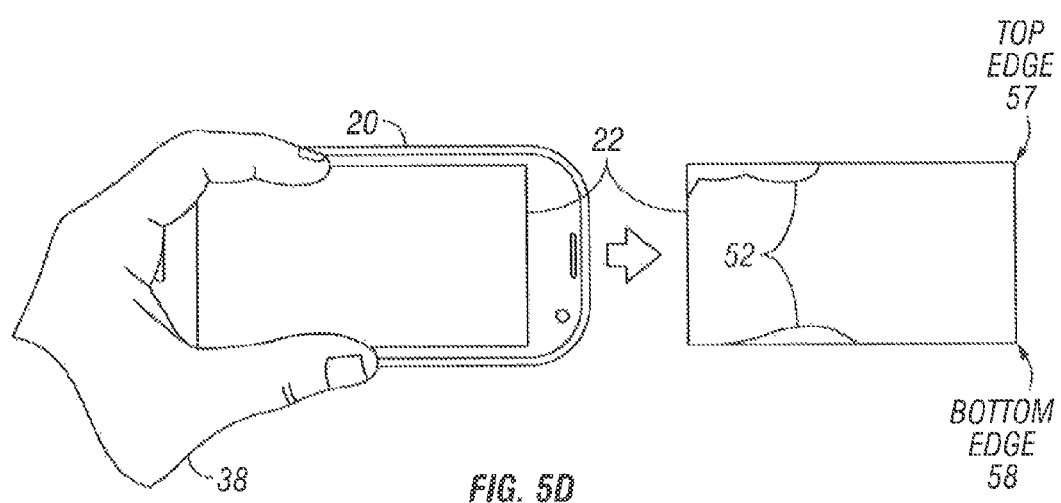

FIGS. 5A-5E illustrate a user holding device 20 in different hands 38 of the user. In FIGS. 5A and 5B, a user is holding device 20 in a portrait (i.e., vertical) orientation. In FIG. 5A, device 20 is being held in a portrait orientation in the user's right hand. In FIG. 5B, device 20 is being held in a portrait orientation in the user's left hand. In FIGS. 5C-5D, a user is holding device 20 in a landscape (i.e., horizontal) orientation in various hands of the user.

In operation, touch sensor 10 utilizes data from sensor 24 in combination with capacitance measurements from electrodes of touchscreen display 22 to determine whether device 20 is being held and which hand of the user is holding device 20. For example, controller 12 of touch sensor 10 may first access data that was collected or generated by sensor 24. In some embodiments, sensor 24 is any appropriate motion sensor and controller 12 accesses data from the motion sensor 24 in order to determine movement of device 20. If the data from motion sensor 24 indicates movement of device 20, controller 12 then determines if there are any touches along any edges of touchscreen display 22. In one example, if controller 12 determines movement of device 20 and detects at least one touch location 52 along at least one edge of touchscreen display 22, controller 12 determines that device 20 is being held in a hand of the user. In some embodiments, controller 12 analyzes the number of touch locations 52 as described below in order to additionally or alternatively determine which hand of the user (i.e., left or right) is holding device 20.

In some embodiments, data from sensor 24 along with touch locations 52 are utilized to determine a particular hand of the user that is holding device 20. For example, FIG. 5A illustrates a right hand of a user that is holding device 20. In this example, signals from the electrodes of touchscreen display 22 indicate a single touch location 52 along a right edge 56 of the touchscreen display 22 and three touch locations 52 along a left edge 54 of the touchscreen display 22. The single touch location 52 along right edge 56 of touchscreen display 22 corresponds to a thumb of the user's right hand and the three touch locations 52 along left edge 54 of touchscreen display 22 correspond to other fingers of the user's right hand that are gripping device 20. Controller 12 may detect this configuration of touch locations 52 (i.e., a single touch location 52 along right edge 56 and two or more touch locations 52 along left edge 54) and thus determine that device 20 is being held in the user's right hand.

FIG. 5B illustrates a left hand of a user that is holding device 20. In this example, signals from the electrodes of touchscreen display 22 indicate a single touch location 52 along a left edge 54 of the touchscreen display 22 and three touch locations 52 along a right edge 56 of the touchscreen display 22. The single touch location 52 along left edge 54 of touchscreen display 22 corresponds to a thumb of the user's left hand and the three touch locations 52 along right edge 56 of touchscreen display 22 correspond to other fingers of the user's left hand that are gripping device 20. Controller 12 may detect this configuration of touch locations 52 (i.e. a single touch location 52 along left edge 54 and two or more touch locations 52 along right edge 56) and thus determine that device 20 is being held in the user's left hand.

As described above, data from sensor 24 is utilized in combination with capacitance measurements of touchscreen display 22 to determine if device 20 is being held and which hand is holding device 20. In some embodiments, sensor 24 is any motion sensor (e.g., an accelerometer, a gyroscope, a compass, and the like) and data from sensor 24 indicates any appropriate movement or orientation of device 20. For example, data from sensor 24 may be data from an accelerometer that indicates whether or not device 20 is moving. In some embodiments, the data may be filtered data. In some embodiments, the data may indicate movement of device 20 above a certain threshold. For example, the threshold may be any non-zero value, and data from sensor 24 above the threshold is determined to be movement of device 20.

In some embodiments, data from sensor 24 is analyzed to determine if the data indicates any non-random movement of device 20. For example, random movement of device 20 may occur when device 20 is located in a pocket of the user. In some embodiments, if data from sensor 24 indicates random movement of device 20, controller 12 determines that device 20 is not being held in a hand of the user.

In some embodiments, data from sensor 24 is analyzed to determine an average movement of device 20. For example, an average movement of device 20 over a certain period of time may be calculated from data from sensor 24. In some embodiments, if the calculated average movement of device 20 over the period of time indicates that device 20 is still, controller 12 determines that device 20 is not being held in a hand of the user.

In some embodiments, data from sensor 24 is analyzed to determine a spatial orientation of device 20. For example, data from sensor 24 may indicate whether device 20 is horizontal, vertical, face-up, face-down, or any other orientation of device 20. In some embodiments, the spatial orientation of device 20 is a three-dimensional position that is represented as a quaternion representation, a rotation matrix, or as a pitch, roll, and yaw combination. In some embodiments, sensor 24 may be a camera or a light sensor and data from the sensor 24 may be utilized to determine whether the device is face-up or face-down. In some embodiments, data from sensor 24 indicates a three dimensional position of device 20 measured in radians. The determined spatial orientation of device 20 may then be used to determine if device 20 is being held and which hand is holding device 20. For example, if it is determined that device 20 is in a vertical (i.e., portrait) orientation as illustrated in FIGS. 5A and 5B, controller 12 may further analyze touch locations 52 along left edge 54 and right edge 56 to determine which hand of the user is holding device 20 as described above. As another example, if it is determined that device 20 is in a horizontal (i.e., landscape) orientation as illustrated in FIGS. 5C-5E below, controller 12 may further analyze any touch locations 52 along top edge 57 and bottom edge 58 to determine that the user is holding device 20.

Figure 5E:
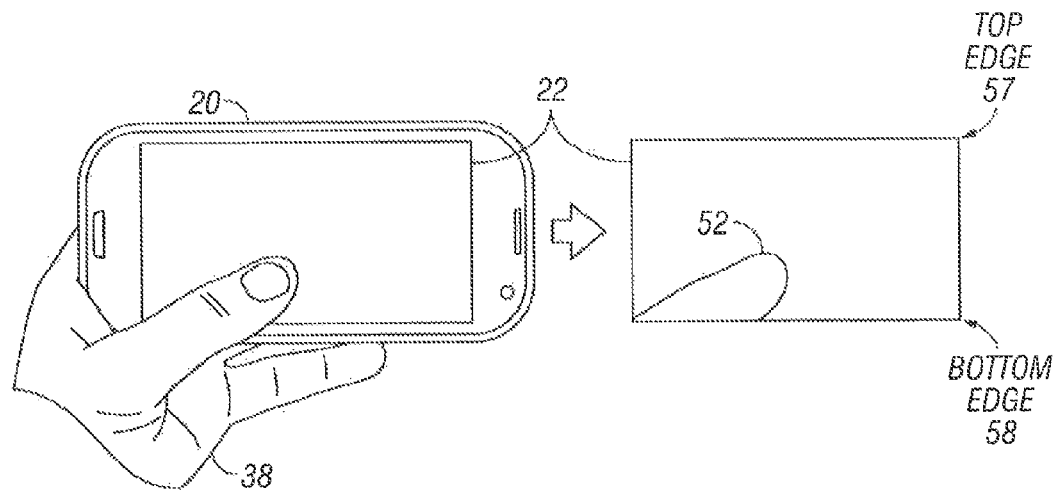

FIGS. 5C-5E illustrate a user holding device 20 in a landscape orientation. In contrast to the typical gripping patterns of device 20 while in a portrait orientation as illustrated in FIGS. 5A and 5B, there is no typical gripping pattern of device 20 while in landscape orientation. That is, while there is typically one touch location 52 from a thumb of a user's hand along one edge of touchscreen display 22 and two or more touch locations 52 from other fingers of the user's hand along an opposite edge of touchscreen display 22 while device 20 is in a portrait orientation, there is no typical pattern of touch locations 52 when device 20 is in a landscape orientation. For example, FIG. 5C illustrates a first grip of device 20 in landscape orientation in which there are two touch locations 52 along top edge 57 of device 20 and one touch location 52 along bottom edge 58. As another example, FIG. 5D illustrates another grip of device 20 in landscape orientation in which there are is one touch location 52 along top edge 57 of device 20 and one touch location 52 along bottom edge 58. As yet another example, FIG. 5D illustrates another grip of device 20 in landscape orientation in which there are is only one touch location 52 along bottom edge 58 of touchscreen display 22.

In some embodiments, once controller 12 determines movement of device 20 and that device 20 is in a landscape orientation, controller 12 may analyze signals from electrodes of touchscreen display 22 to determine if there are any touch locations 52 along any edge of touchscreen display 22. If it is determined that there is at least one touch location 52 along any edge (e.g., top edge 57 or bottom edge 58) of touchscreen display 22, controller 12 determines that device 20 is being held in a hand of the user. Device 20 may then react accordingly by, for example, enabling the GPS of device 20 or enabling other portions of device 20 that had been previously powered-down.

In certain embodiments, an alternative or additional sensor 24 may be utilized to determine whether a user is holding device 20. For example, controller 12 may access humidity or temperature data from a temperature or humidity sensor 24. If the accessed data from these sensors 24 indicates an elevated temperature or humidity, or indicates a temperature or humidity within a certain range or above a certain threshold consistent with human touch, controller 12 may then proceed to analyze touch locations 52 as described above to determine if device 20 is being held and determine which hand of the user is holding device 20.

Figure 6:
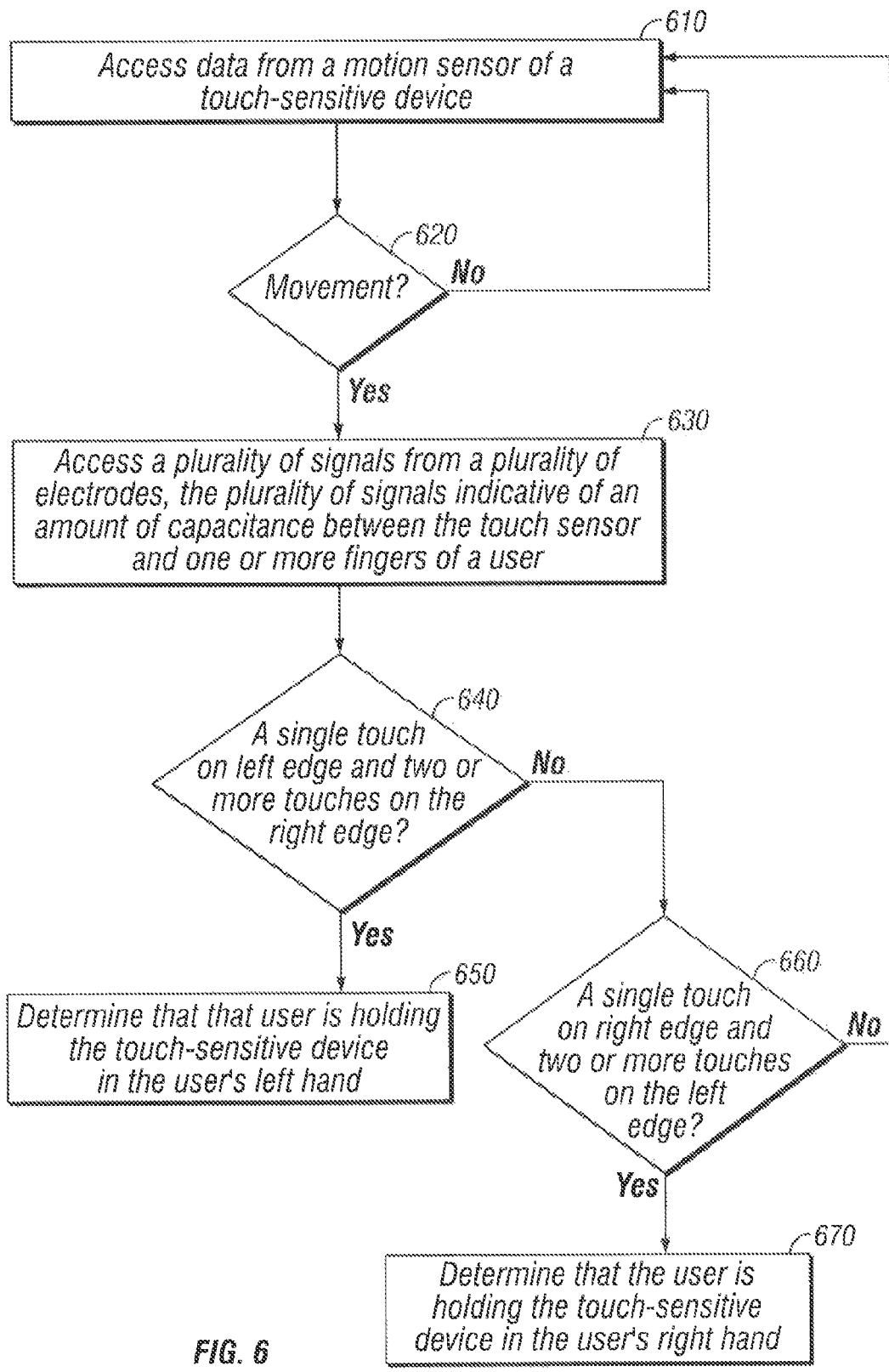
FIG. 6 illustrates an example method that is used in certain embodiments to determine which hand of the user is holding the device of FIG. 2, according to certain embodiments.

FIG. 6 illustrates an example method 600 that is used in certain embodiments to determine which hand of the user is holding device 20. Method 600 begins in step 610 where data is accessed from a motion sensor of a touch-sensitive device. In some embodiments, the data that is accessed in step 610 is data from sensor 24, described above. In some embodiments, the touch-sensitive device is device 20.

In step 620, it is determined whether the data accessed in step 610 indicates any movement of the touch-sensitive device. In some embodiments, an average movement of the touch-sensitive device is determined in step 620. In some embodiments, it is determined in step 620 whether movement of the touch-sensitive device is random. In certain embodiments, it is determined in step 620 whether movement of the touch-sensitive device is above a predetermined threshold. In some embodiments, step 620 may include determining a spatial orientation of the touch-sensitive device. If any appropriate movement of the touch-sensitive device is detected in step 620, method 600 proceeds to step 630. Otherwise, method 600 proceeds back to step 610.

In step 630, signals from electrodes of a touch sensor are accessed. In some embodiments, the signals are indicative of an amount of capacitance between the touch sensor and one or more fingers of a user. In some embodiments, the electrodes are drive electrodes 32 and sense electrodes 34. In some embodiments, the signals are associated with touches of the one or more fingers of the user along one or more edges of the touch sensor that are typically ignored or otherwise suppressed.

In step 640, it is determined whether the signals accessed in step 630 indicate a single touch on a left edge of the touch sensor and two or more touches on the right edge of the touch sensor. If it is determined in step 640 that the signals accessed in step 630 indicate a single touch on a left edge of the touch sensor and two or more touches on the right edge of the touch sensor, method 600 proceeds to step 650 where it is determined that the touch-sensitive device is being held in a left hand of the user. If it is determined in step 640 that the signals accessed in step 630 do not indicate a single touch on a left edge of the touch sensor and two or more touches on the right edge of the touch sensor, method 600 proceeds to step 660.

In step 660, it is determined whether the signals accessed in step 630 indicate a single touch on a right edge of the touch sensor and two or more touches on the left edge of the touch sensor. If it is determined in step 660 that the signals accessed in step 630 indicate a single touch on a right edge of the touch sensor and two or more touches on the left edge of the touch sensor, method 600 proceeds to step 670 where it is determined that the touch-sensitive device is being held in a right hand of the user.

Figure 7:
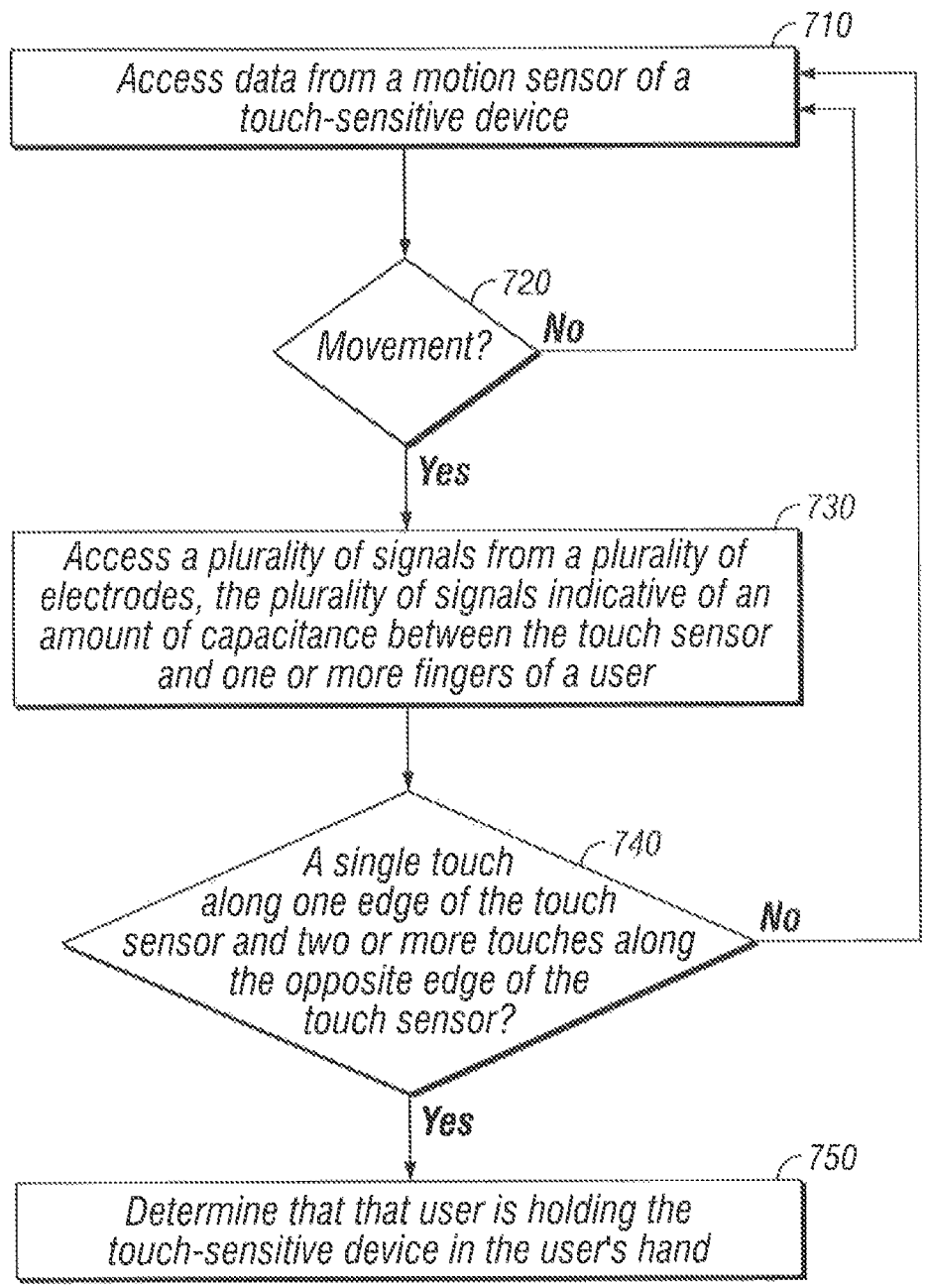
FIG. 7 illustrates an example method that is used in certain embodiments to determine that the user is holding the device of FIG. 2, according to certain embodiments.

FIG. 7 illustrates an example method 700 that is used in certain embodiments to determine that the user is holding device 20. Method 700 begins in step 710 where data is accessed from a sensor of a touch-sensitive device. In some embodiments, the data that is accessed in step 710 is data from a touch sensor 24, described above. In some embodiments, the touch-sensitive device is device 20.

In step 720, it is determined whether the data accessed in step 710 indicates any movement of the touch-sensitive device. In some embodiments, an average movement of the touch-sensitive device is determined in step 720. In some embodiments, it is determined in step 720 whether movement of the touch-sensitive device is random. In certain embodiments, it is determined in step 720 whether movement of the touch-sensitive device is above a predetermined threshold. In some embodiments, step 720 may include determining a spatial orientation of the touch-sensitive device. If any appropriate movement of the touch-sensitive device is detected in step 720, method 700 proceeds to step 730. Otherwise, method 700 proceeds back to step 710.

In step 730, signals from electrodes of a touch sensor are accessed. In some embodiments, the signals are indicative of an amount of capacitance between the touch sensor and one or more fingers of a user. In some embodiments, the electrodes are drive electrodes 32 and sense electrodes 34. In some embodiments, the signals are associated with touches of the one or more fingers of the user along one or more edges of the touch sensor that are typically ignored or otherwise suppressed.

In step 740, it is determined whether the signals accessed in step 730 indicate a single touch along one edge of the touch sensor and two or more touches along an opposite edge of the touch sensor. In some embodiments, the edges may include a left, right, top, or bottom edge of the touch sensor. If it is determined in step 740 that the signals accessed in step 730 indicate a single touch along one edge of the touch sensor and two or more touches along an opposite edge of the touch sensor, method 700 proceeds to step 750 where it is determined that the touch-sensitive device is being held in a hand of the user. If it is determined in step 740 that the signals accessed in step 730 do not indicate a single touch along one edge of the touch sensor and two or more touches along an opposite edge of the touch sensor, method 700 proceeds back to step 710.

In some embodiments, if it is determined in step 720 that the touch-sensitive device is in a landscape (i.e., horizontal) orientation, it is determined in step 740 whether the signals accessed in step 730 indicate one or more touches along any edge of the touch sensor. In some embodiments, the edge may include a left, right, top, or bottom edge of the touch sensor. If it is determined in step 740 that the signals accessed in step 730 indicate one or more touches along any edge of the touch sensor, method 700 proceeds to step 750 where it is determined that the touch-sensitive device is being held in a hand of the user. If it is determined in step 740 that the signals accessed in step 730 do not indicate a single touch along any edge of the touch sensor, method 700 proceeds back to step 710.

Accordingly, example embodiments disclosed herein provide a touch sensor that is capable determining whether a touch-sensitive device is being held and which hand of the user is holding the device. As a result, devices utilizing embodiments of the disclosed touch sensor may have improved efficiency and power management and therefore may consume less power. Furthermore, devices utilizing embodiments of the disclosed touch sensor may provide an enhanced user experience by tailoring or altering a GUI based on a determination of which hand the user is holding the device. Accordingly, embodiments of the disclosure provide numerous enhancements over typical touch sensors.

Although the preceding examples given here generally rely on self capacitance or mutual capacitance to operate, other embodiments of the invention will use other technologies, including other capacitance measures, resistance, or other such sense technologies.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein. "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor for a touch-sensitive device comprising:
   a plurality of electrodes of a touchscreen display of the touch-sensitive device;
   a controller communicatively coupled to the plurality of electrodes, the controller operable to:
   access data from a motion sensor of the touch-sensitive device;
   access a plurality of signals from the plurality of electrodes, the plurality of signals indicative of an amount of capacitance between the plurality of electrodes and one or more fingers of a user;
   determine a spatial orientation of the touch-sensitive device; and
   after determining that the data from the motion sensor indicates that the touch-sensitive device is moving, determine, based on the plurality of signals from the plurality of electrodes, a particular hand of the user that is holding the touch-sensitive device; wherein
   when the spatial orientation is determined to be a vertical orientation, the particular hand of the user that is holding the touch-sensitive device is determined based on touch patterns directly on left and right edges of the touchscreen display of the touch-sensitive device;
   when the plurality of signals from the plurality of electrodes indicate a single touch location directly on a left edge of the touchscreen display and two or more touch locations directly on a right edge of the touchscreen display, the particular hand of the user is determined to be a left hand of the user; and
   when the plurality of signals from the plurality of electrodes indicate a single touch location directly on the right edge of the touchscreen display and two or more touch locations directly on the left edge of the touchscreen display, the particular hand of the user is determined to be a right hand of the user.

2. The touch sensor of claim 1, wherein the controller is further operable to determine that the data from the motion sensor indicates movement of the touch-sensitive device above a threshold.

3. The touch sensor of claim 1, wherein the controller is further operable to determine that the data from the motion sensor indicates non-random movement of the touch-sensitive device.

4. The touch sensor of claim 1, wherein the controller is further operable to determine, using the data from the motion sensor, an average movement of the touch-sensitive device.

5. The touch sensor of claim 1, wherein the motion sensor comprises one of:
   an accelerometer;
   a gyroscope; or
   a compass.

6. The touch sensor of claim 1, wherein the touch sensor is one of:
   a self-capacitance touch sensor; or
   a mutual-capacitance touch sensor, wherein the plurality of electrodes comprises a plurality of sense electrodes and a plurality of drive electrodes.

7. A computer-readable non-transitory storage medium embodying logic that is operable when executed by a processor to:
   access data from a sensor of a touch-sensitive device;
   access a plurality of signals from a plurality of electrodes of a touchscreen display of the touch-sensitive device, the plurality of signals indicative of an amount of capacitance between the plurality of electrodes and one or more fingers of a user;
   determine a spatial orientation of the touch-sensitive device; and
   after determining that the data from the sensor indicates that the touch-sensitive device is moving, determine, based on the plurality of signals from the plurality of electrodes, a particular hand of the user that is holding the touch-sensitive device; wherein
   when the spatial orientation is determined to be a vertical orientation, the particular hand of the user that is holding the touch-sensitive device is determined based on touch patterns directly on left and right edges of the touchscreen display of the touch-sensitive device;
   when the plurality of signals from the plurality of electrodes indicate a single touch location directly on a left edge of the touchscreen display and two or more touch locations directly on a right edge of the touchscreen display, the particular hand of the user is determined to be a left hand of the user; and
   when the plurality of signals from the plurality of electrodes indicate a single touch location directly on the right edge of the touchscreen display and two or more touch locations directly on the left edge of the touchscreen display, the particular hand of the user is determined to be a right hand of the user.

8. A method comprising:
   accessing, by a controller of a touch-sensitive device, data from a sensor of the touch-sensitive device;
   accessing, by the controller of the touch-sensitive device, a plurality of signals from a plurality of electrodes of a touchscreen display of the touch-sensitive device, the plurality of signals indicative of an amount of capacitance between the plurality of electrodes and one or more fingers of a user;

determine a spatial orientation of the touch-sensitive device; and after determining that the data from the sensor indicates that the touch-sensitive device is moving, determining, by the controller of the touch-sensitive device based on the plurality of signals from the plurality of electrodes, that the user is holding the touch-sensitive device in a particular hand of the user; wherein when the spatial orientation is determined to be a vertical orientation, the particular hand of the user that is holding the touch-sensitive device is determined based on touch patterns directly on left and right edges of a touchscreen display of the touch-sensitive device;

when the plurality of signals from the plurality of electrodes indicate a single touch location directly on a left edge of the touchscreen display and two or more touch locations directly on a right edge of the touchscreen display, the particular hand of the user is determined to be a left hand of the user; and when the plurality of signals from the plurality of electrodes indicate a single touch location directly on the right edge of the touchscreen display and two or more touch locations directly on the left edge of the touchscreen display, the particular hand of the user is determined to be a right hand of the user.

9. The method of claim 8, wherein determining that the data from the sensor indicates movement of the touch-sensitive device comprises determining that the data indicates non-random movement of the touch-sensitive device, a movement of the touch-sensitive device above a first threshold, or an average movement of the touch-sensitive device above a second threshold.

10. The method of claim 8, wherein the sensor comprises one or more of:
   an accelerometer;
   a gyroscope;
   a compass;
   a light sensor;
   a camera;
   a temperature sensor; or
   a humidity sensor.

11. The touch sensor of claim 1, wherein the touchscreen display is on a front side of the touch-sensitive device.

* * * * *